US009223453B2

(12) United States Patent
Lee

(10) Patent No.: US 9,223,453 B2
(45) Date of Patent: Dec. 29, 2015

(54) IN-CELL TOUCH DISPLAY PANEL DEVICE WITH THREE-DIMENSIONALLY CONFIGURED SENSING BLOCKS

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 14/487,351

(22) Filed: Sep. 16, 2014

(65) Prior Publication Data

US 2015/0301650 A1    Oct. 22, 2015

(30) Foreign Application Priority Data

Apr. 21, 2014  (CN) .................... 2014 2 0194242 U

(51) Int. Cl.
*G06F 3/044*    (2006.01)
*G06F 3/041*    (2006.01)
(52) U.S. Cl.
CPC .............. *G06F 3/044* (2013.01); *G06F 3/0412* (2013.01)
(58) Field of Classification Search
CPC .......................... G06F 3/044; G06F 3/04112
See application file for complete search history.

(56) References Cited

U.S. PATENT DOCUMENTS

2008/0048989 A1*  2/2008  Yoon ................... G02F 1/13338
                                                      345/173
2012/0268396 A1* 10/2012  Kim ...................... G06F 3/0412
                                                      345/173

* cited by examiner

*Primary Examiner* — Liliana Cerullo
(74) *Attorney, Agent, or Firm* — Muncy, Geissler, Olds & Lowe, P.C.

(57) ABSTRACT

An in-cell touch display panel device includes an upper substrate, a lower substrate, and a display controlling and sensing structure layer including a data line sub-layer and a scan line sub-layer. The data line sub-layer has plural data lines and plural first dashed conductor lines, each first dashed conductor line being formed by continuing plural first conductor segments. The scan line sub-layer has plural scan lines and plural second dashed conductor lines, each second dashed conductor line being formed by continuing plural second conductor segments. The data lines are disposed at positions identical to those of the second dashed conductor lines, and the first dashed conductor lines are disposed at positions identical to those of the scan lines, so as to form a touch sensing pattern structure by using conductor parts to selectively connect the first dashed conductor lines and the second dashed conductor lines.

10 Claims, 7 Drawing Sheets

IN-CELL TOUCH DISPLAY PANEL DEVICE WITH THREE-DIMENSIONALLY CONFIGURED SENSING BLOCKS

BACKGROUND OF THE INVENTION

1. Field of the Invention

The present invention relates a touch display panel and, more particularly, to an in-cell touch display panel device with three-dimensionally configured sensing blocks.

2. Description of Related Art

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate, and increase reflectance and haze of the touch display panel.

On-cell and in-cell touch technology were invented to overcome the drawbacks of traditional touch technology described above. The on-cell technology is to dispose a sensor on the back side of a color filter substrate to form a completed color filter substrate. The on-cell touch technology is provided to dispose a touch sensor of projected capacitive touch technology on a back side of color filter (CF) thin film and then be integrated into the color filter. The in-cell technology is to dispose the sensor within the LCD cell structure. Currently, there are resistive, capacitive and optical three primary in-cell touch technologies, wherein the resistive touch technology employs two conductive substrates and the voltage variation of a common layer between the two substrates for determining a touch position on the touch display panel. The on-cell technology is to dispose a sensor of touch panel on a thin film and then attach it to a glass of uppermost upper substrate.

The out-cell touch technology is provided to add a touch module onto a display module and is most commonly seen. The resistive and capacitive technologies are usually manufactured by touch panel manufactures and then fitted and assembled with the display panel.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by TFT LCD manufactures.

However, for all the in-cell, on-cell and out-cell touch technologies, they all need a sensing layer to be configured on an upper or lower glass substrate, which not only increases the manufacturing cost but also complicates the manufacturing process, and which may also lower the aperture ratio and thus need to increase the strength of backlight, resulting in huge power consumption which is disadvantageous to make the mobile device compact. Therefore, it desired for the aforementioned touch display panel structure to be improved.

SUMMARY OF THE INVENTION

The object of the present invention is to provide an in-cell touch display panel device with three-dimensionally configured sensing blocks, which not only decreases weight and thickness of the TFT touch display panel but also saves the material and processing cost, so as to provide the display panel with touch control function without modifying the manufacturing process.

To achieve the object, there is provided an in-cell touch display panel device, which comprises: an upper substrate; a lower substrate parallel to the upper substrate; a display material layer configured between the upper substrate and the lower substrate; a black matrix layer disposed at one side of the upper substrate facing the display material layer, the black matrix layer being composed of a plurality of opaque lines; and a display controlling and sensing structure layer disposed at one side of the lower substrate facing the display material layer, which includes: a data line sub-layer having a plurality of data lines and a plurality of first dashed conductor lines, each data line being extended in a first direction, the plurality of data lines being arranged along a second direction, each first dashed conductor line being formed by continuing a plurality of first conductor segments extended in the second direction, two continued first conductor segments of each first dashed conductor line being separated by a data line intersected therewith, the plurality of first dashed conductor lines being arranged along the first direction; and a scan line sub-layer having a plurality of scan lines and a plurality of second dashed conductor lines, each scan line being extended in the second direction, the plurality of scan lines being arranged along the first direction, each second dashed conductor line being formed by continuing a plurality of second conductor segments extended in the first direction, two continued second conductor segments of each second dashed conductor line being separated by a scan line intersected therewith, the plurality of second dashed conductor lines being arranged along the second direction, wherein the plurality of data lines disposed at positions identical to those of the plurality of second dashed conductor lines, and the plurality of first dashed conductor lines disposed at positions identical to those of the plurality of scan lines, so as to form a touch sensing pattern structure by using conductor parts to selectively connect the plurality of first dashed conductor lines and the plurality of second dashed conductor lines.

DETAILED DESCRIPTION OF THE PREFERRED EMBODIMENT

Figure 1:
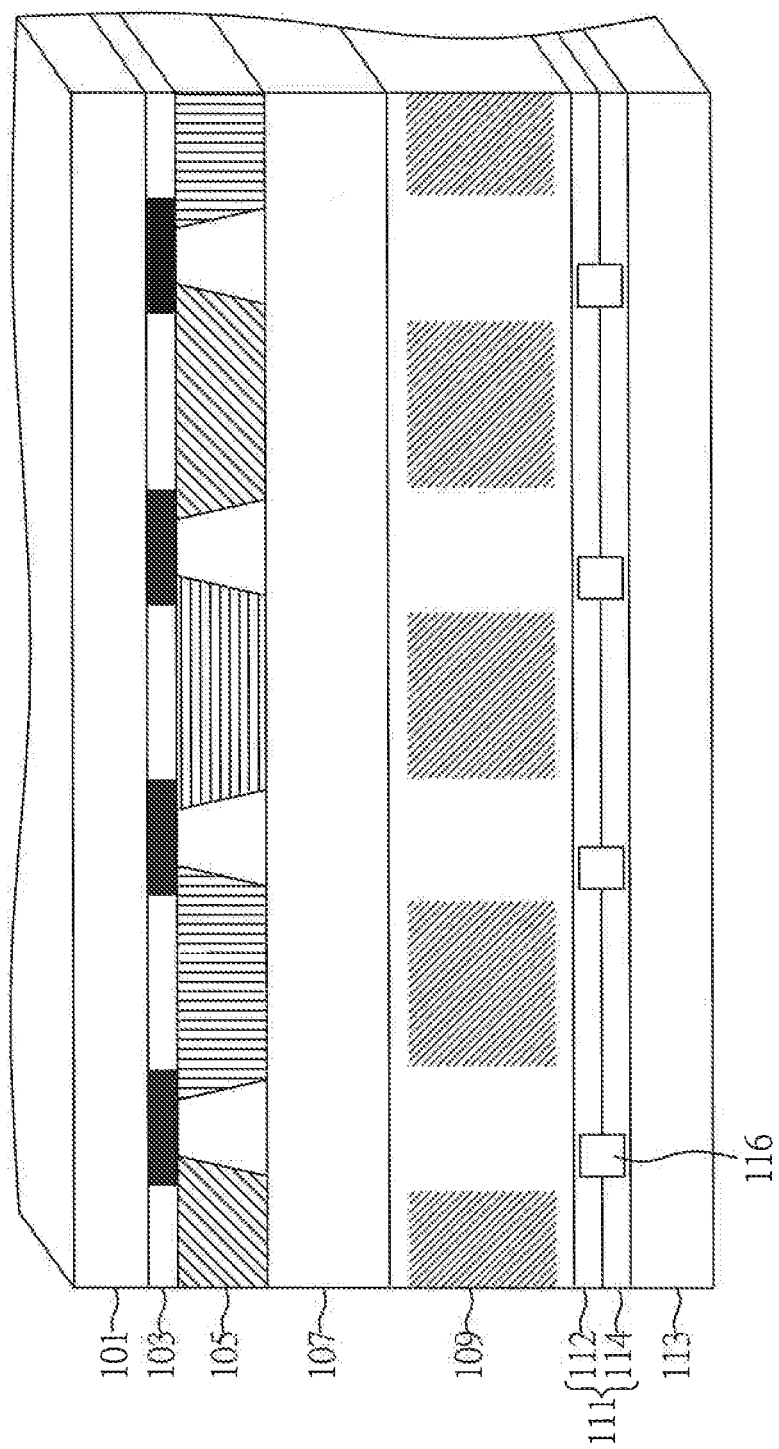
FIG. 1 is a stack-up diagram of an in-cell touch display panel device with three-dimensionally configured sensing blocks in accordance with the present invention.

FIG. 1 is a stack-up diagram of an in-cell touch display panel device with three-dimensionally configured sensing blocks in accordance with the present invention. As shown, the in-cell touch display panel device 10 comprises: an upper substrate 101, a black matrix layer 103, a color filter layer 105, an over coat layer 107, a display material layer 109, a display controlling and sensing structure layer 111, and a lower substrate 113 from up to down in sequence.

The upper substrate 101 and lower substrate 113 are preferably glass substrates. The display material layer 109 is configured between the upper substrate 101 and the lower substrate 113 and is preferably a liquid crystal layer or a white organic light diode layer.

Figure 2:
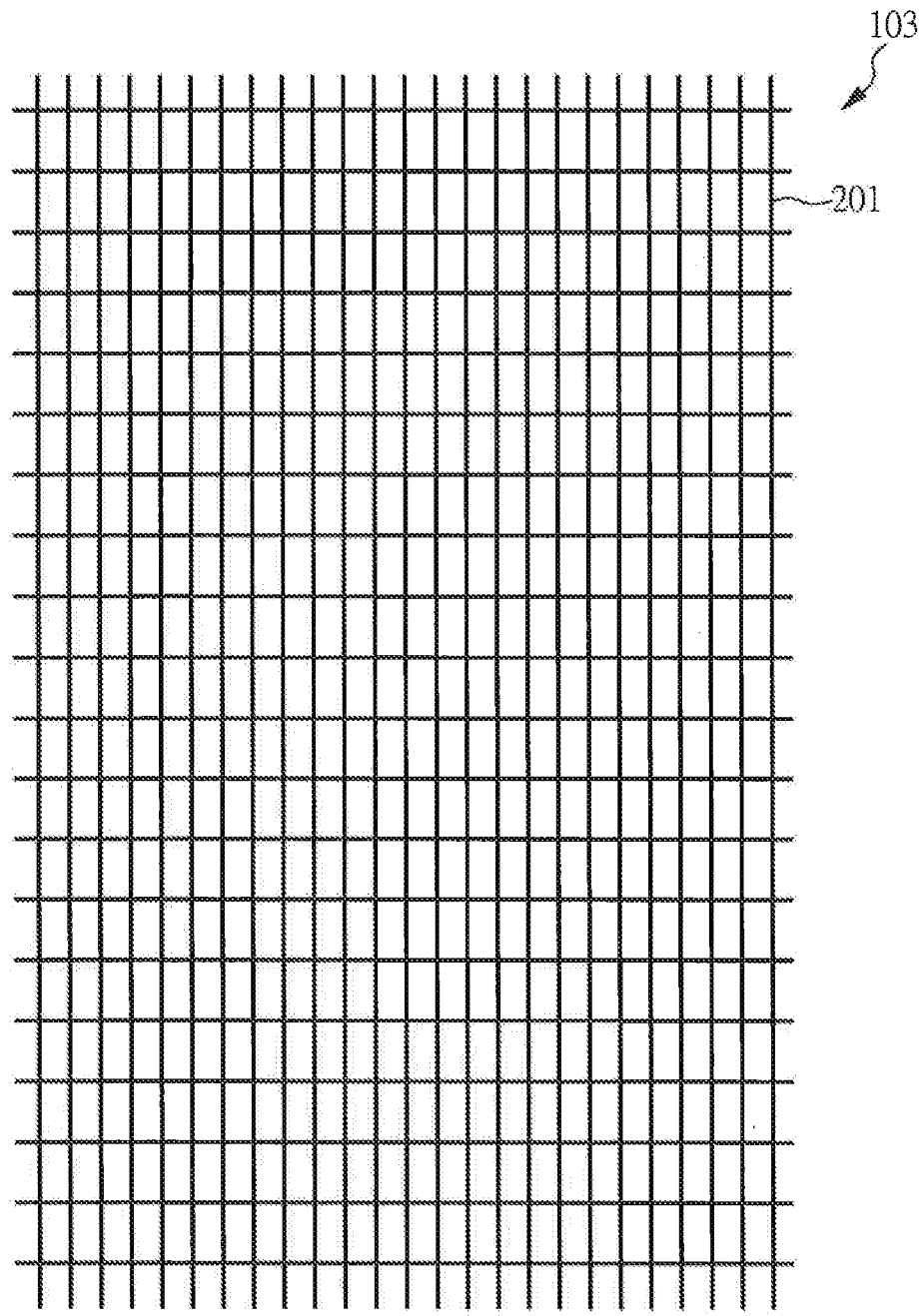
FIG. 2 is a schematic diagram of a black matrix layer.

The black matrix layer 103 is disposed at one side of the upper substrate 101 facing the display material layer 109. As shown in FIG. 2, the black matrix layer 103 is composed of a plurality of opaque black insulating lines 201, and the plurality of opaque black insulating lines 201 are perpendicular to each other and are distributed in a matrix form. The color filter layer 160 is distributed over regions among the plurality of opaque black insulating lines 201 of the black matrix layer 103.

The display controlling and sensing structure layer 111 is disposed at one side of the lower substrate 113 facing the display material layer 109. The display controlling and sensing structure layer 111 is composed of a data line sub-layer 112, a scan line sub-layer 114, and a plurality of pixel circuits 116 arranged among the data line sub-layer 112 and scan line sub-layer 114.

Figure 3:
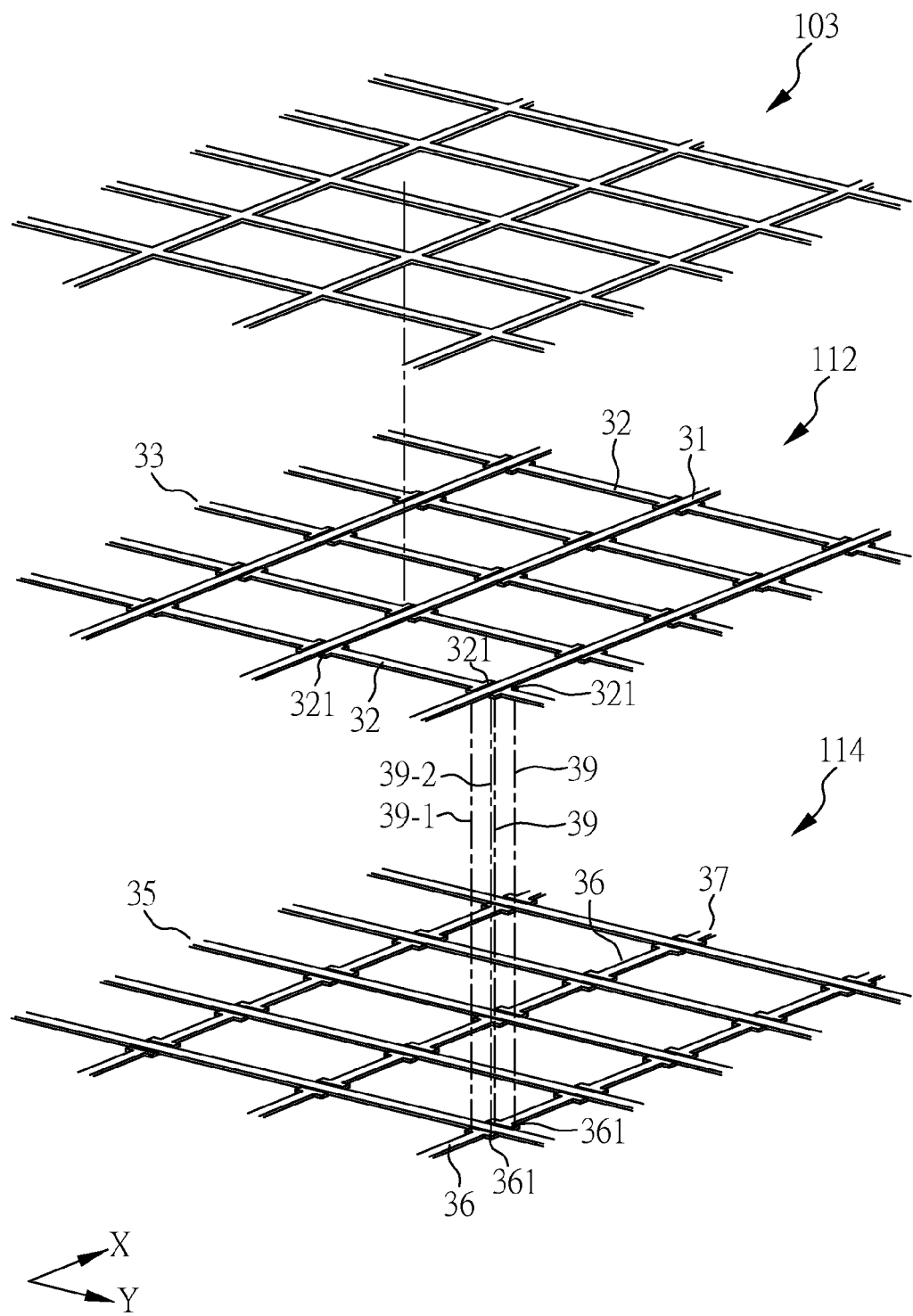
FIG. 3 illustrates the three-dimensional arrangement of a black matrix layer, a data line sub-layer, and a scan line sub-layer.

FIG. 3 illustrates the three-dimensional arrangement of a black matrix layer 103, a data line sub-layer 112, and a scan line sub-layer 114. The three-dimensional arrangement of the data line sub-layer 112 has a plurality of data lines 31 and a plurality of first dashed conductor lines 33. Each data line 31 is extended in a first direction (X-axis direction), and the plurality of data lines 31 are separately arranged (e.g. equally spaced) along a second direction (Y-axis direction), wherein the first direction is substantially vertical to the second direction. Each first dashed conductor line 33 is formed by continuing a plurality of first conductor segments 32 extended in the second direction, wherein two continued first conductor segments 32 of each first dashed conductor line 33 are separated by a data line 31 intersected with said first dashed conductor line 33, and the plurality of first dashed conductor lines 33 are separately arranged (e.g. equally spaced) along the first direction.

Also, in FIG. 3, the three-dimensional arrangement of the scan line sub-layer 114 has a plurality of scan lines 35 and a plurality of second dashed conductor lines 37. Each scan line 35 is extended in the second direction, and the plurality of scan lines 35 are separately arranged (e.g. equally spaced) along the first direction. Each second dashed conductor lines 37 is formed by continuing a plurality of second conductor segments 36 extended in the first direction, wherein two continued second conductor segments 36 of each second dashed conductor line 37 are separated by a scan line 35 intersected with said second dashed conductor line 37, and the plurality of second dashed conductor lines 37 are separately arranged (e.g. equally spaced) along the second direction. It is noted that the data line sub-layer 112 is separated from the scan line sub-layer 114 by a distance, in which an insulator can be arranged so that the data lines 31 and the first dashed conductor lines 33 do not come into touch with the second dashed conductor lines 37 and the scan lines 35.

Figure 4:
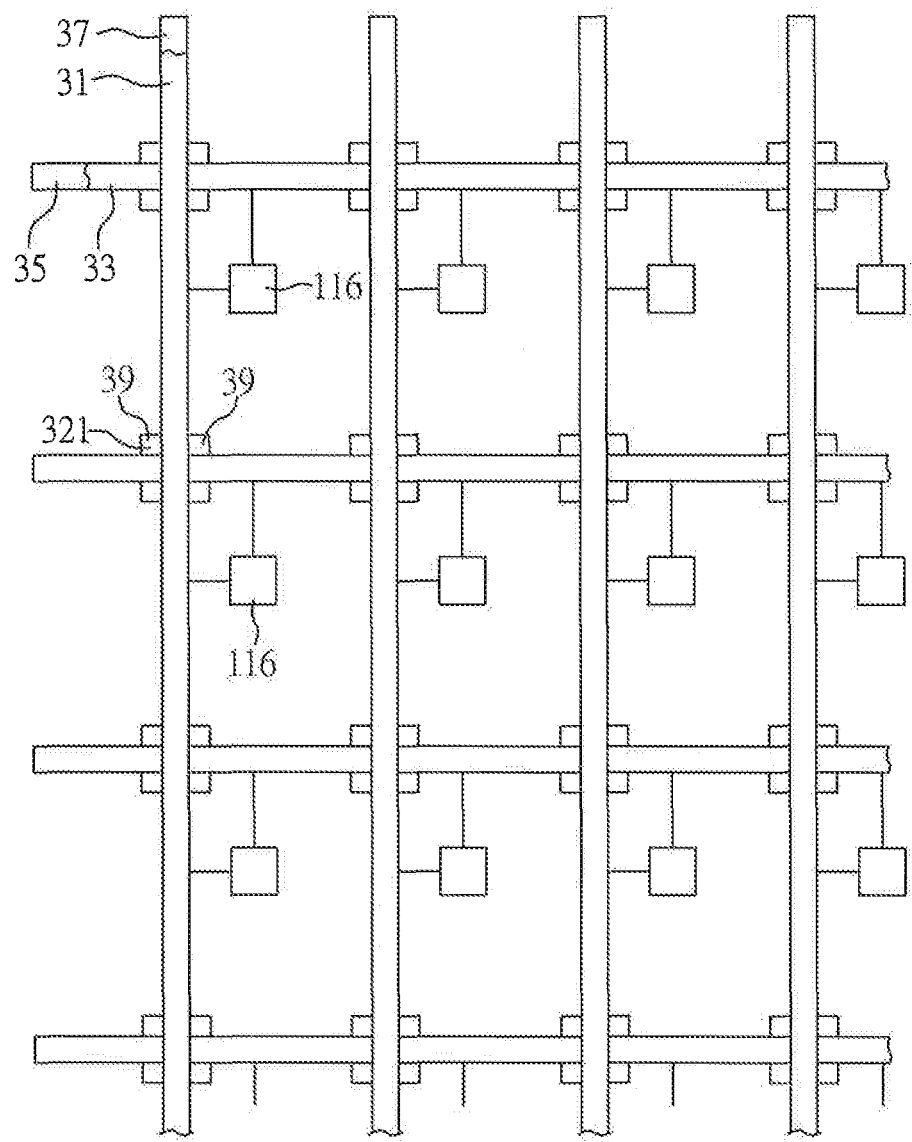
FIG. 4 is a plane view of the circuit arrangement of a display controlling and sensing structure layer according to the present invention.

FIG. 4 is a plane view of the circuit arrangement of a display controlling and sensing structure layer according to the present invention, which is viewed in a direction from the upper substrate 101 to the lower substrate 113. With reference to FIGS. 3 and 4, it can be seen that the data line sub-layer 112 is disposed above the scan line sub-layer 114, the plurality of data lines 31 of the data line sub-layer 112 are disposed at positions identical to the positions of the plurality of second dashed conductor lines 37 of the scan line sub-layer 114, and each data line 31 has a width equal to or slightly larger than that of each second dashed conductor line 37. Therefore, in the figures, the plurality of second dashed conductor lines 37 are concealed via substantially overlapping with the plurality of data lines 31, respectively. Similarly, it can be seen that the data line sub-layer 112 is disposed above the scan line sub-layer 114, the plurality of first dashed conductor lines 33 of the data line sub-layer 112 are disposed at positions identical to the positions of the plurality of scan lines 35 of the scan line sub-layer 114, and each scan line 35 has a width equal to or slightly larger than that of each first dashed conductor line 33. Therefore, in the figures, the plurality of scan lines 35 are concealed via substantially overlapping with the plurality of first dashed conductor lines 33. Besides, the plurality of pixel circuits 116 are schematically illustrated in the figure. According to the arrangement of aforementioned data line sub-layer 112 and scan line sub-layer 114, it is known that the plurality of data lines 31 and the plurality of scan lines 35 of the display controlling and sensing structure layer 111 are disposed at different layers and non-conductively intersected with each other, and one pixel circuit 116 is disposed at each intersected position. The pixel circuit 116 is driven by the scan line 35 connected therewith for performing the pixel display according to the data line 31 connected therewith, which is the basic display principle of flat display panel and thus a detailed description is deemed unnecessary.

Figure 5:
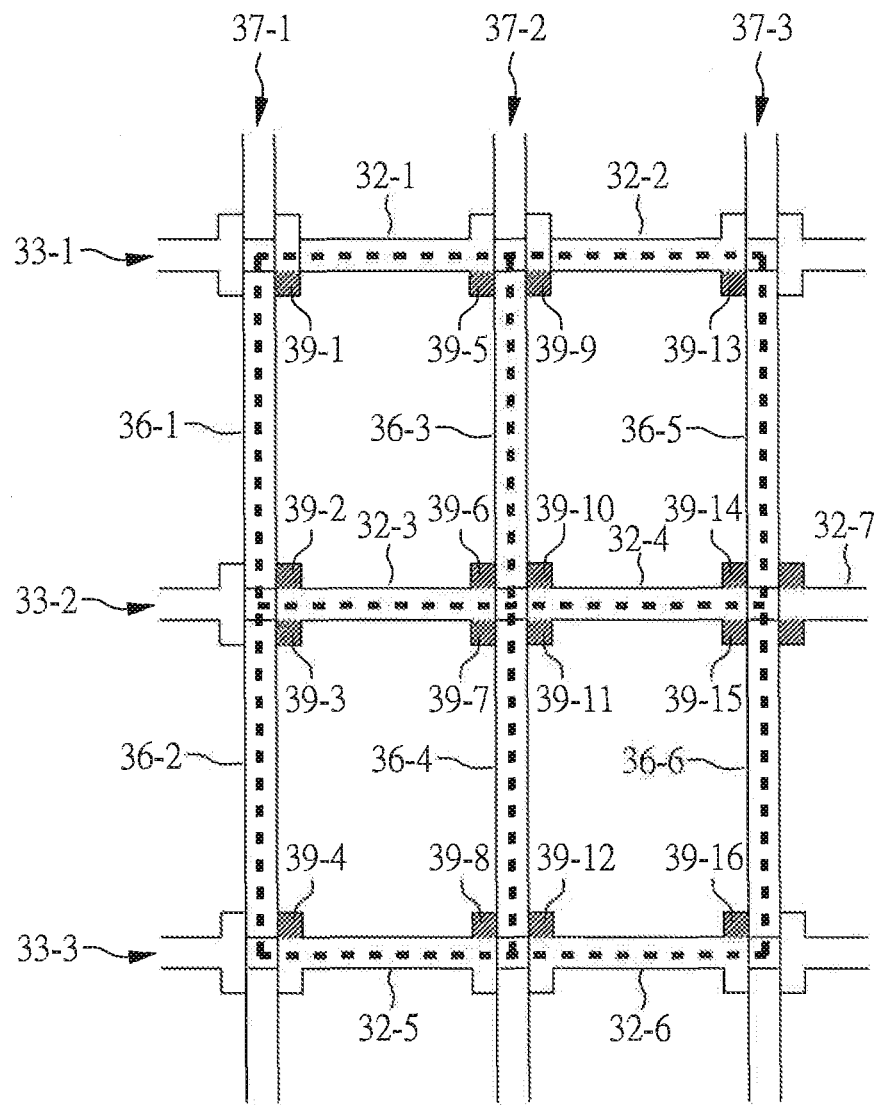
FIG. 5 schematically illustrates a polygon pattern formed by arranging conductor parts between the extension parts of the first conductor segments on the data line sub-layer and the extension parts of the second conductor segments on the scan line sub-layer.
Figure 6:
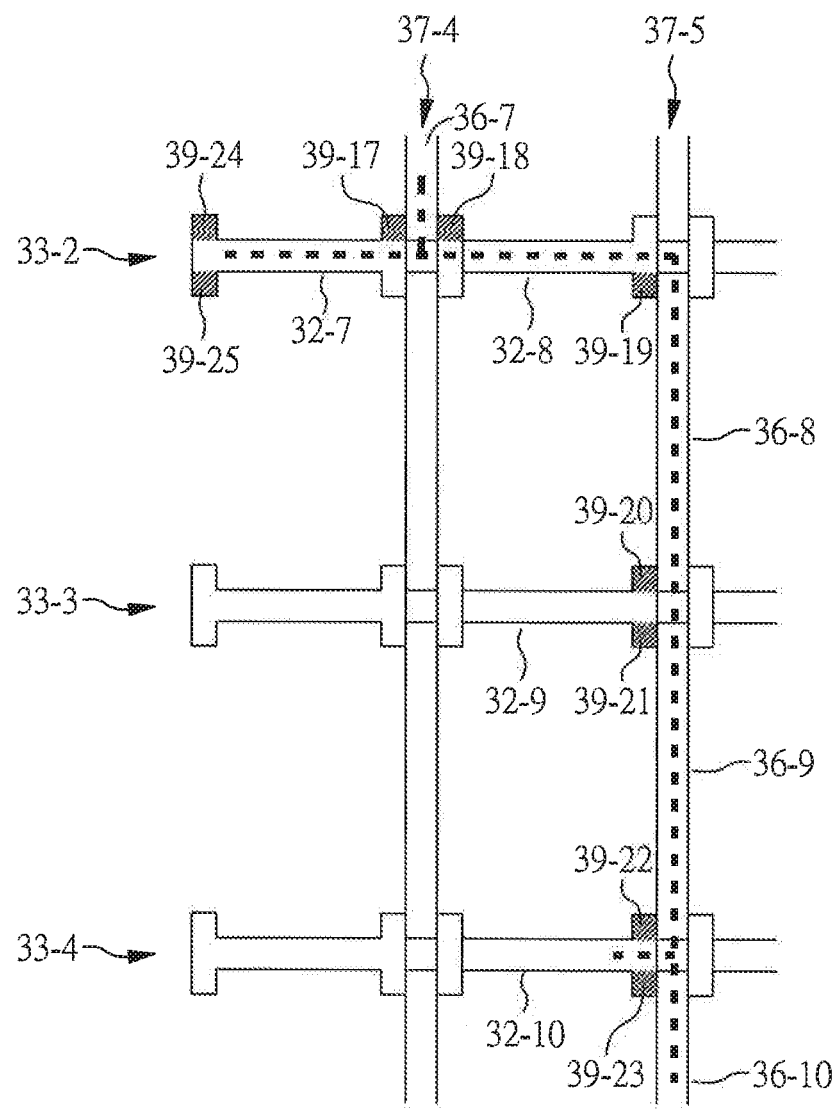
FIG. 6 schematically illustrates a linear wiring pattern formed by arranging conductor parts between the extension parts of the first conductor segments on the data line sub-layer and the extension parts of the second conductor segments on the scan line sub-layer.

In the present invention, the plurality of first dashed conductor lines 33 of the data line sub-layer 112 and the plurality of second dashed conductor lines 37 of the scan line sub-layer 114 are connected via conductor parts in the vertical direction for forming a touch sensing pattern structure. As shown in FIGS. 3 and 4, each first conductor segment 32 of the data line sub-layer 112 has two ends, and each end has an extension part 321 extended toward two sides of the first conductor segment 32 and having a width slightly larger than that of the scan line 35. Each second conductor segment 36 of the scan line sub-layer 114 has two ends, and each end has an extension part 361 extended toward two sides of the second conductor segment 36 and having a width slightly larger than that of the data line 31. Due to that the plurality of data lines 31 of the data line sub-layer 112 are disposed at positions identical to the positions of the plurality of second dashed conductor lines 37 of the scan line sub-layer 114 and the plurality of first dashed conductor lines 33 of the data line sub-layer 112 are disposed at positions identical to the positions of the plurality of scan lines 35 of the scan line sub-layer 114, the extension part 321 of any one of the first conductor segments 32 of the data line sub-layer 112 can be connected to the extension parts 361 of two corresponding second conductor segments 36 of the scan line sub-layer 114 below and intersected with said first conductor segment 32 via two conductor parts 39-1, 39-2 in vertical direction, respectively. Accordingly, by selectively arranging the conductor parts 39 between the extension parts 321 of the first conductor segments 32 on the data line sub-layer 112 and the extension parts 361 of the second conductor segments 36 on the scan line sub-layer 114, it is able to program a touch sensing pattern from the plurality of first dashed conductor lines 33 and the plurality of second dashed conductor lines 37. FIGS. 5 and 6 illustrate how to use the plurality of the conductor parts 39 disposed between the extension part 321 of first conductor segment 32 on the data line sub-layer 112 and the extension part 361 of second conductor segment 36 on the scan line sub-layer 114 to form polygon and linear line patterns.

FIG. 5 illustrates a region where three second dashed conductor lines 37-1, 37-2, 37-3 are intersected with three first dashed conductor lines 33-1, 33-2, 33-3, wherein the data lines 31 and scan lines 35 overlapped with the dashed conductor lines are not shown for more clearly presenting the touch sensing pattern. As shown in FIG. 5, a second conductor segment 36-1 of the second dashed conductor line 37-1 is connected with a first conductor segment 32-1 of the first dashed conductor lines 33-1 via a conductor part 39-1 disposed therebetween; the second conductor segment 36-1 of the second dashed conductor line 37-1 is connected with a first conductor segment 32-3 of the first dashed conductor lines 33-2 via a conductor part 39-2 disposed therebetween; a second conductor segment 36-2 of the second dashed conductor line 37-1 is connected with the first conductor segment 32-3 of the first dashed conductor line 33-2 via a conductor part 39-3 disposed therebetween; the second conductor segment 36-2 of the second dashed conductor line 37-1 is connected with a first conductor segment 32-5 of the first dashed conductor line 33-3 via a conductor part 39-4 disposed therebetween; a second conductor segment 36-3 of the second dashed conductor line 37-2 is connected with a first conductor segment 32-1 of the first dashed conductor line 33-1 via a conductor part 39-5 disposed therebetween; a second conductor segment 36-3 of the second dashed conductor line 37-2 is connected with the first conductor segment 32-3 of the first dashed conductor line 33-2 via a conductor part 39-6 disposed therebetween; a second conductor segment 36-4 of the second dashed conductor line 37-2 is connected with the first conductor segment 32-3 of the first dashed conductor line 33-2 via a conductor part 39-7 disposed therebetween; the second conductor segment 36-4 of the second dashed conductor line 37-2 is connected with a first conductor segment 32-5 of the first dashed conductor line 33-3 via a conductor part 39-8 disposed therebetween; the second conductor segment 36-3 of the second dashed conductor line 37-2 is connected with a first conductor segment 32-2 of the first dashed conductor line 33-1 via a conductor part 39-9 disposed therebetween; the second conductor segment 36-3 of the second dashed conductor line 37-2 is connected with a first conductor segment 32-4 of the first dashed conductor line 33-2 via a conductor part 39-10 disposed therebetween; the second conductor segment 36-4 of the second dashed conductor line 37-2 is connected with the first conductor segment 32-4 of the first dashed conductor line 33-2 via a conductor part 39-11 disposed therebetween; the second conductor segment 36-4 of the second dashed conductor line 37-2 is connected with a first conductor segment 32-6 of the first dashed conductor line 33-3 via a conductor part 39-12 disposed therebetween; a second conductor segment 36-5 of the second dashed conductor line 37-3 is connected with the first conductor segment 32-2 of the first dashed conductor lines 33-1 via a conductor part 39-13 disposed therebetween; the second conductor segment 36-5 of the second dashed conductor line 37-3 is connected with the first conductor segment 32-4 of the first dashed conductor line 33-2 via a conductor part 39-14 disposed therebetween; a second conductor segment 36-6 of the second dashed conductor line 37-3 is connected with the first conductor segment 32-4 of the first dashed conductor line 33-2 via a conductor part 39-15 disposed therebetween; the second conductor segment 36-6 of the second dashed conductor line 37-3 is connected with a first conductor segment 32-6 of the first dashed conductor lines 33-3 via a conductor part 39-16 disposed therebetween. With the aforementioned connections, the second conductor segments 36-1 to 36-6 and the first conductor segment 32-1 to 32-6 are connected to form a polygon touch sensing block.

FIG. 6 illustrates a region where two second dashed conductor lines 37-4, 37-5 are intersected with three first dashed conductor lines 33-2, 33-3, 33-4, wherein the data lines 31 and scan lines 35 overlapped with the dashed conductor lines are not shown for more clearly presenting the touch sensing pattern. As shown in FIG. 6, a second conductor segment 36-7 of the second dashed conductor line 37-4 is connected with a first conductor segment 32-7 of the first dashed conductor line 33-2 via a conductor part 39-17 disposed therebetween; the second conductor segment 36-7 of the second dashed conductor line 37-4 is connected with a first conductor segment 32-8 of the first dashed conductor line 33-2 via a conductor part 39-18 disposed therebetween; a second conductor segment 36-8 of the second dashed conductor line 37-5 is connected with the first conductor segment 32-8 of the first dashed conductor line 33-2 via a conductor part 39-19 disposed therebetween; the second conductor segment 36-8 of the second dashed conductor line 37-5 is connected with a first conductor segment 32-9 of the first dashed conductor line 33-3 via a conductor part 39-20 disposed therebetween; a second conductor segment 36-9 of the second dashed conductor line 37-5 is connected with the first conductor segment 32-9 of the first dashed conductor line 33-3 via a conductor part 39-21 disposed therebetween; the second conductor segment 36-9 of the second dashed conductor line 37-5 is connected with a first conductor segment 32-10 of the first dashed conductor lines 33-4 via a conductor part 39-22 disposed therebetween; a second conductor segment 36-10 of the second dashed conductor line 37-5 is connected with the first conductor segment 32-10 of the first dashed conductor lines 33-4 via a conductor part 39-23 disposed therebetween. With the aforementioned connections, the second conductor segments 36-7 to 36-10 and the first conductor segment 32-7 to 32-10 are connected to form a bent linear line.

Accordingly, it is known that the present invention is able to form a plurality of polygon touch sensing blocks arranged in a matrix form and a plurality of linear wirings respectively connected therewith by selectively disposing a plurality of conductor parts 39 between the extension parts 321 of the first conductor segments 32 on the data line sub-layer 112 and the extension parts 361 of the second conductor segments 36 on the scan line sub-layer 114, so as to program a touch sensing pattern. The touch sensing blocks formed in FIG. 5 can be connected to the linear wirings formed in FIG. 6 by disposing the conductor parts 39 between the second conductor segments 36 of the second dashed conductor lines 37 and the first conductor segments 32 of the first dashed conductor lines 33. For example, assuming that the first conductor segment 32-7 in FIG. 5 is the first conductor segment 32-7 in FIG. 6, the touch sensing block and the linear wiring are connected by disposing the conductor part 39-24 between the second conductor segment 36-5 of the second dashed conductor line 37-3 and the first conductor segment 32-7 of the first dashed conductor line 33-2 and/or disposing the conductor part 39-25 between the second conductor segment 36-6 of the second dashed conductor line 37-3 and the first conductor segment 32-7 of the first dashed conductor line 33-2.

Figure 7:
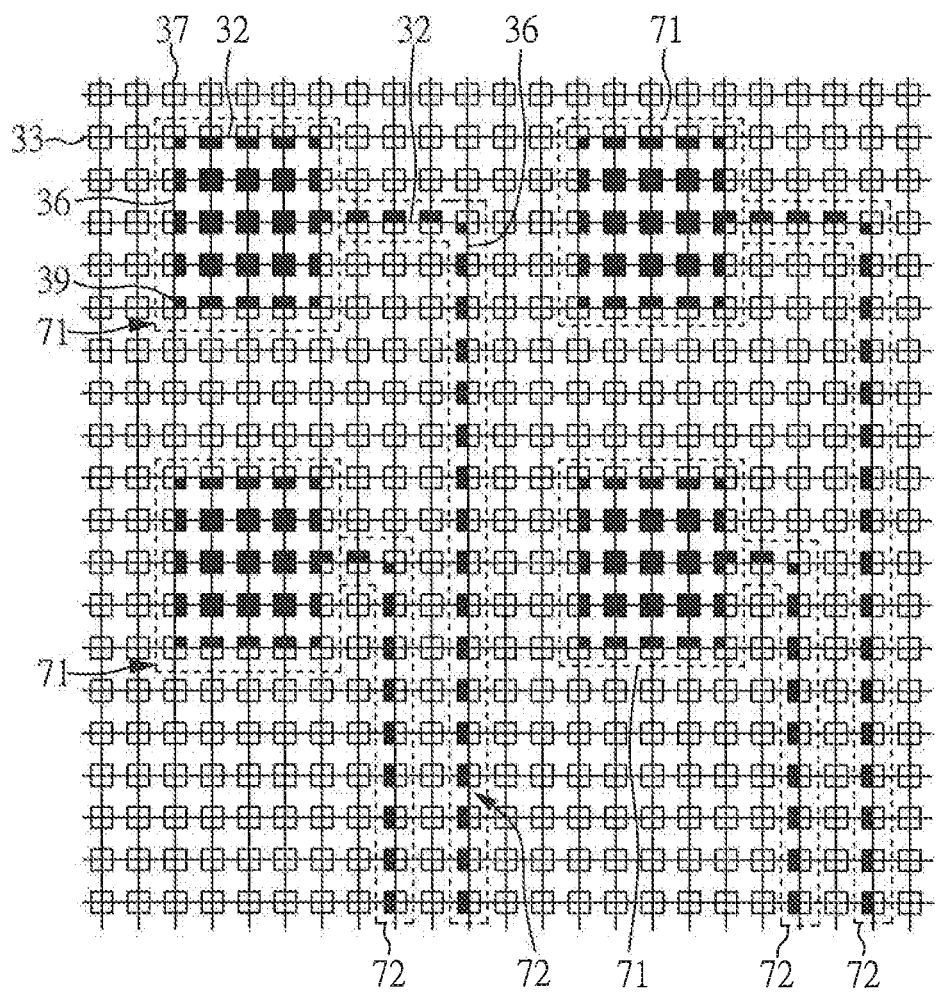
FIG. 7 is a schematic diagram of sensing pattern formed by first dashed conductor lines and second dashed conductor lines.

FIG. 7 is a schematic diagram of the touch sensing pattern formed by first dashed conductor lines 33 and second dashed conductor lines 37, wherein the data lines 31 and scan lines 35 overlapped with the dashed conductor lines are not shown for more clearly presenting the touch sensing pattern. As shown in FIG. 7, the four squares disposed at the intersection of each first dashed conductor line 33 and each second dashed conductor line 37 represent the portion where the extension parts 321 of the first conductor segments 32 are overlapped with the extension parts 361 of the second conductor segments 36, wherein a solid square represents that a conductor part 39 is arranged therebetween for connection, and a hollow square represents that no conductor part 39 is arranged therebetween and thus there is no connection. As shown, by disposing the conductor parts 39 between the extension parts 321 of the first conductor segments 32 and the extension parts 361 of second conductor segments 36 in a polygon region 71, the first conductor segments 32 and the second conductor segments 36 in the polygon region 71 are connected for forming a polygon touch sensing block. In the present invention, a plurality of polygon regions 71 arranged in a matrix form are formed, wherein the first and second conductor segments 32, 36 in each polygon region 71 are electrically connected together while any two polygon regions are not connected. Furthermore, by disposing the conductor parts 39 between the extension parts 321 of the first conductor segments 32 and the extension parts 361 of the second conductor segments 36 in a linear wiring region 72, the first conductor segments 32 and the second conductor segments 36 in the linear wiring region 72 are connected for forming a linear wiring. In the present invention, a plurality of linear wiring regions 72 are formed, and each linear wiring is connected to a corresponding polygon touch sensing block while any two linear wirings are not connected. In FIG. 4, there are four linear wirings and four polygon touch sensing blocks shown for illustrative purpose only, while those skilled in the art will understand that, in the actual situation, there should be more linear wirings and polygon touch sensing blocks arranged in a matrix form and connected therewith for realizing a touch sensing block structure. Besides, the dimensional relationships among individual elements in the figures are illustrated only for the ease of understanding, but not to limit the actual scale. The extension parts 361, 321 only occupy a very small area and thus do not affect the light penetration rate of liquid crystal. In this embodiment, the polygon block 71 is, but not limited to, a square. The polygon block 71 may also be a rectangle, rhombus, triangle, trapezoid, circle, hexagon, octagon, star shape, radiation shape, or wedge shape.

In addition, as shown in FIG. 3, the plurality of opaque lines 201 of the black matrix layer 103 are disposed at positions corresponding to the positions of the plurality of scan lines 35 and the plurality of data lines 31, as in the known liquid crystal display, so that the plurality of opaque lines 201 of the black matrix layer 103 shield the plurality of scan lines 35 and the plurality of data lines 31. In the present invention, the plurality of second dashed conductor lines 37 arranged along the first direction are disposed at positions identical to the positions of the data lines 31 but in different layers. Similarly, the plurality of first dashed conductor line 33 arranged along the second direction are disposed at positions identical to the positions of the scan lines 35 but in different layers. The data lines 31 and the scan lines 35 are disposed below the opaque lines 201. The second dashed conductor line 37 and the first dashed conductor line 33 are disposed at positions corresponding to the plurality of scan lines 35 and data lines 31; i.e., the plurality of opaque lines 201 of the black matrix layer 103 are disposed at positions corresponding to the positions of the plurality of scan lines 35 and the plurality of data lines 31. Therefore, the second dashed conductor line 37 and the first dashed conductor line 33 are also shielded by the plurality of opaque lines 201.

In view of the foregoing, it is known that the present invention is capable of forming a touch sensing pattern structure on the display controlling and sensing structure layer 111, which has the advantage of not requiring to arrange a sensing electrode layer on the upper glass substrate or lower glass substrate of the LCD panel, thereby lowering the cost and decreasing the number of manufacturing steps. Meanwhile, the plurality of scan lines 35 can be defined on the mask used in the present invention for defining the plurality of second dashed conductor lines 37, and the plurality of data lines 31 can be defined on the mask used in the present invention for defining the plurality of first dashed conductor lines 33. Accordingly, the number of manufacturing steps is not increased and thus the display panel is provided with touch function without adding any new manufacturing step.

Although the present invention has been explained in relation to its preferred embodiment, it is to be understood that many other possible modifications and variations can be made without departing from the spirit and scope of the invention as hereinafter claimed.

What is claimed is:

1. An in-cell touch display panel device, comprising:
    an upper substrate;
    a lower substrate parallel to the upper substrate;
    a display material layer configured between the upper substrate and the lower substrate;
    a black matrix layer disposed at one side of the upper substrate facing the display material layer, the black matrix layer being composed of a plurality of opaque lines; and
    a display controlling and sensing structure layer disposed at one side of the lower substrate facing the display material layer, which includes:
    a data line sub-layer having a plurality of data lines and a plurality of first dashed conductor lines, each data line being extended in a first direction, the plurality of data lines being arranged along a second direction, each first dashed conductor line being formed by continuing a plurality of first conductor segments extended in the second direction, two continued first conductor segments of each first dashed conductor line being separated by a data line intersected therewith, the plurality of first dashed conductor lines being arranged along the first direction; and
    a scan line sub-layer having a plurality of scan lines and a plurality of second dashed conductor lines, each scan line being extended in the second direction, the plurality of scan lines being arranged along the first direction, each second dashed conductor line being formed by continuing a plurality of second conductor segments extended in the first direction, two continued second conductor segments of each second dashed conductor line being separated by a scan line intersected therewith, the plurality of second dashed conductor lines being arranged along the second direction,
    wherein the plurality of data lines disposed at positions identical to those of the plurality of second dashed conductor lines, and the plurality of first dashed conductor lines disposed at positions identical to those of the plurality of scan lines, so as to form a touch sensing pattern structure by using conductor parts to selectively connect the plurality of first dashed conductor lines and the plurality of second dashed conductor lines.

2. The in-cell touch display panel device as claimed in claim 1, wherein the plurality of opaque lines of the black matrix layer are disposed at positions corresponding to those of the plurality of scan lines and the plurality of data lines, so that the plurality of opaque lines of the black matrix layer shield the plurality of scan lines and the plurality of data lines.

3. The in-cell touch display panel device as claimed in claim 2, wherein each data line has a width equal to or slightly larger than that of each second dashed conductor line, and each scan line has a width equal to or slightly larger than that of each first dashed conductor line.

4. The in-cell touch display panel device as claimed in claim 3, wherein the display controlling and sensing structure layer further comprises:
  a plurality of pixel circuits disposed at intersecting positions of the plurality of scan lines and the plurality of data lines, respectively.

5. The in-cell touch display panel device as claimed in claim 3, wherein each first conductor segment has two ends and each end has an extension part extended toward two sides of the first conductor segment and having a width slightly larger than that of the scan line; each second conductor segment has two ends and each end has an extension part extended toward two sides of the second conductor segment and having a width slightly larger than that of the data line, so that the extension part of anyone first conductor segment is connected to the extension parts of two corresponding second conductor segments below and intersected with the first conductor segment via one conductor part.

6. The in-cell touch display panel device as claimed in claim 5, wherein the conductor part is a via.

7. The in-cell touch display panel device as claimed in claim 3, wherein a plurality of the conductor parts are selectively disposed between the extension parts of the first conductor segments on the data line sub-layer and the extension parts of the second conductor segments on the scan line sub-layer, so as to form a plurality of polygon touch sensing blocks arranged in a matrix form and a plurality of linear wirings.

8. The in-cell touch display panel device as claimed in claim 7, wherein the first and second conductor segments in each polygon touch sensing block are electrically connected together while any two polygon touch sensing blocks are not connected.

9. The in-cell touch display panel device as claimed in claim 7, wherein each linear wiring is connected to a corresponding polygon touch sensing block while any two linear wirings are not connected.

10. The in-cell touch display panel device as claimed in claim 1, wherein the first direction is substantially vertical to the second direction.

* * * * *